(12) United States Patent
Fleming et al.

(10) Patent No.: US 6,267,341 B1
(45) Date of Patent: Jul. 31, 2001

(54) MAGNETIC SWIVEL DATUM MOUNTING OF PARTS FOR DIGITAL SURFACE MEASUREMENT

(75) Inventors: Todd J. Fleming, Livonia; George Husulak, Sterling Heights; Robert S. Rekar, New Baltimore; Donald J. Ponagajba, Madison Heights, all of MI (US)

(73) Assignee: DaimlerChrysler Corp., Auburn Hills, MI (US)

( * ) Notice: Subject to any disclaimer, the term of this patent is extended or adjusted under 35 U.S.C. 154(b) by 0 days.

(21) Appl. No.: 09/282,475

(22) Filed: Mar. 31, 1999

(51) Int. Cl.[7] ....................................................... A47G 1/17
(52) U.S. Cl. ..................................... 248/309.4; 248/181.2; 248/288; 403/DIG. 1; 403/133; 403/122
(58) Field of Search .............................. 248/309.4, 181.1, 248/181.2, 288.31, 206.5; 403/DIG. 1, 133, 140, 122

(56) References Cited

U.S. PATENT DOCUMENTS

| | | | |
|---|---|---|---|
| 4,986,689 | * 1/1991 | Drutchas | 403/127 |
| 5,580,121 | 12/1996 | Dange et al. | 296/186 |
| 5,704,582 | 1/1998 | Golembiewski et al. | 248/500 |
| 5,857,815 | * 1/1999 | Bailey et al. | 409/201 |
| 5,993,212 | * 11/1999 | Shiner | 433/172 |
| 6,010,271 | * 1/2000 | Jackson et al. | 403/131 |

* cited by examiner

Primary Examiner—Leslie A. Braun
Assistant Examiner—Gwendolyn Baxter
(74) Attorney, Agent, or Firm—Mark P. Calcaterra

(57) ABSTRACT

For performing a surface measurement procedure on one side of a complex part such as a stamped steel inner door panel having compound curves, a magnetic swiveling support device for securing the opposite side of the part without adding projecting structure such as clamps or fixtures on the one side which interferes with the measurement process. Functionally, the magnetic swiveling support provides a non-clamping apparatus to accurately secure a complex part having a curved surface for surface measurement by automatic digital measuring techniques and equipment.

4 Claims, 4 Drawing Sheets

MAGNETIC SWIVEL DATUM MOUNTING OF PARTS FOR DIGITAL SURFACE MEASUREMENT

BACKGROUND OF THE INVENTION

1. Field of the Invention

This application relates generally to apparatus for supporting a complex part such as a stamped sheet metal inner door panel having compound curves in a fixed position for surface measurements without interference to measurement by clamps or fixtures which project from the surface. Basically, the subject apparatus provides a substantially clampless support arrangement to accurately secure a complex part for measurement by automatically controlled digital measuring equipment.

2. Background of the Invention

For monitoring stamping quality, the surface of a relatively complex automobile body part such as a vehicle inner door panel is digitally measured through digital electronic automation (DEA). The DEA process utilizes an automatic tracking device or coordinate measuring machine (CCM) to move an sensor in relation to a stamped part to be measured. The sensor is mounted upon an arm and is selectively moved to contact particular sites on a surface of the stamped part to generate digital measurement data. This digital data is received into a computer which is programmed to compare the measurements with a set of desired geometric dimensions and tolerances (GD & T).

It is important that a vehicle inner door panel is accurately produced as a vehicle door is a composite of at least an inner and an outer panel to produce the complete vehicle door. The outer panel is attached to the inner panel and how well the door fits in an opening in the vehicle body can be effected by the accuracy of the inner and outer door panels. Thus, both panels must be assembled and attached together in a manner to create a very accurate composite. Both the inner and the outer panel have a relatively complex shape with non-parallel curved surfaces. If the panels are inaccurately formed during the stamping operation, the resultant composite door may not accurately fit in the vehicle door opening or its exterior surface may not properly align with the adjacent surfaces of the other parts of the vehicle.

Currently, deviations from desired GD & T are uncovered by periodically measuring a sample door panel by the CMM. As previously mentioned, the CMM supports a surface measuring sensor, essentially a very accurate switch. Such a sensor which is currently used to measure surfaces is manufactured by Renishaw in the United Kingdom, Model K60606. As the CMM moves the sensor, it measures various selected surface sites on the stamped part and feeds the data into the associated computer in digital format. The computer is programmed to receive the data and compare it with the GD & T to determine whether the part is within desired specifications and tolerances.

However, before measurements can be taken and data generated, the sample stamped part must first be accurately positioned in a desired orientation and then accurately held in that position during the measurement process. Thus, before using the CMM to take measurement data, a plurality of adjustable support columns (usually four or five) are very accurately positioned. The support columns support the stamped part to be measured which is laid over the support columns. When the columns are properly adjusted in a vertical direction, the stamped part is rigidly supported but must be restrained against the upper ends of the columns to prevent movements. Currently, clamps are used to hold a stamped part against the upper end of the columns. A typical clamp has a U-shaped configuration allowing it to extend around the edge portion of the stamped part. This unfortunately also places a portion of the clamp over a portion of the surface to be measured with a portion projecting upwardly from the surface. This upwardly projecting portion of the clamp usually will interfere with the movement of the sensor. In fact, measurements adjacent the clamp are usually impossible without first reclamping the part away from the desired measurement area and then removing that clamp that interferes with the desired measurement. In addition, unless very carefully regulated, an excess force can be placed on the stamped part by the clamp which can cause distortion of the part and resultant inaccuracies in surface measurement.

SUMMARY OF THE INVENTION

A primary object of the subject application is to eliminate or significantly reduce the necessity for use of clamps in the above described DEA surface measuring process. Accordingly, the subject application presents a clamp replacement in the form of a magnetic swivel datum (MSD) pad or mount. An MSD is attached to the upper end portion of the aforedescribed support column and is constructed to provide a versatile support for an angulated or irregular surface of a stamped part. Specifically, the MSD pad utilizes a ball type connection to accommodate angulated surfaces of a stamped part and secure it to the column without any upwardly projecting portions which could interfere with a measurement by the CMM sensor.

Specifically, the MSD pad comprises a short support shaft having a substantially spherical upper end portion which is partially encapsulated in a pad part. The pad part is pivotally movable about the spherical end portion but is accurately fixed to the shaft. This allows a flat top surface of the pad to adjust to any angulated surface of a stamping. The short support shaft is insertablely mounted in a recess of a column support which was previously identified. Countersunk in the flat top surface of the pad is at least one magnet so that the surface of the magnet is flush with the surface. Resultantly, when a steel inner door panel, for example, is positioned in overlying relationship to the flat surface of the pad, a magnetic force restrains the panel from movements.

The MSD described above permits the placement of the part onto the upward facing surface of the base while magnetic force secures the part to the MSD and the support column without the necessity of providing a clamp which typically extended upwardly from the surface of the part which undesirably interferes with the previously described DEA measurement process.

BRIEF DESCRIPTION OF THE DRAWINGS

The invention will be better understood from a reading of the detailed description and the accompanying drawings, wherein.

DETAILED DESCRIPTION OF THE PREFERRED EMBODIMENT AND METHOD

Figure 1:
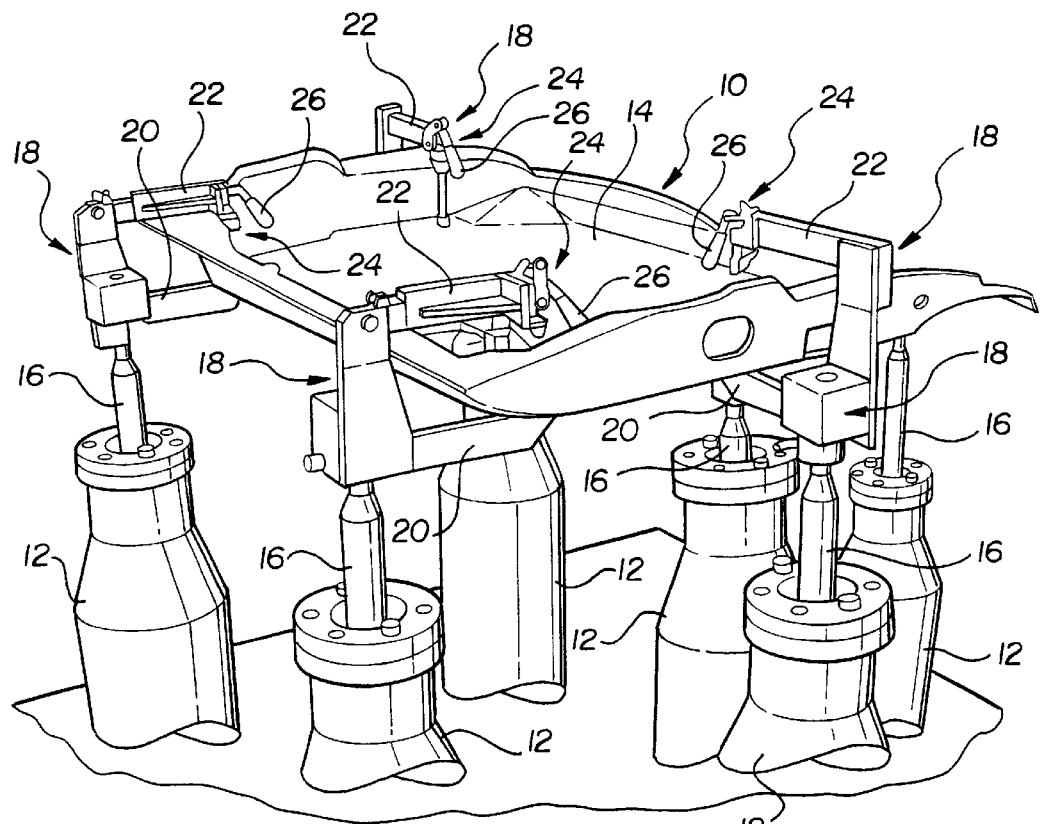
FIG. 1 is a perspective view of a prior art support system with clamps for securing a stamped door panel during measurement.

This application is directed to an apparatus for supporting and retaining a part having a complex configuration including compound curves. Such a part that matches this characterization is a stamped inner door panel 10 for a vehicle as seen in FIG. 1. The inner panel 10 is supported in FIG. 1 by a plurality of column support assemblies 12. Specifically, inner panel 10 is shown with its exterior or outward surface 14 facing upright with its weight supported upon several support shafts 16 vertically adjustable with respect to the column assemblies 12. These column support assemblies 12 are commercially available and are made by a U.S. firm by the name of Brown & Sharpe.

Figure 2:
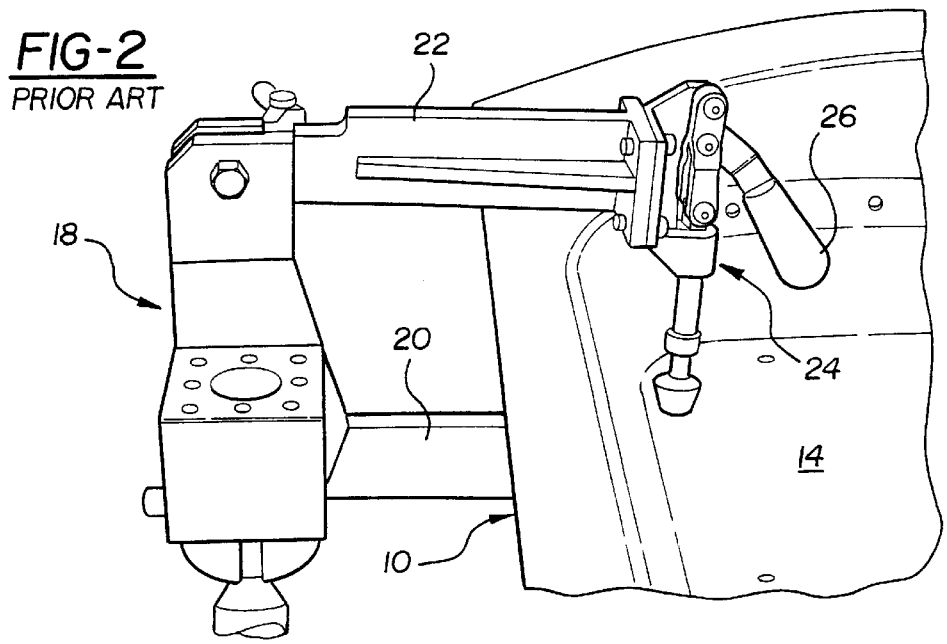
FIG. 2 is an enlarged perspective view of one prior art support system with clamps shown in FIG. 1.
Figure 3:
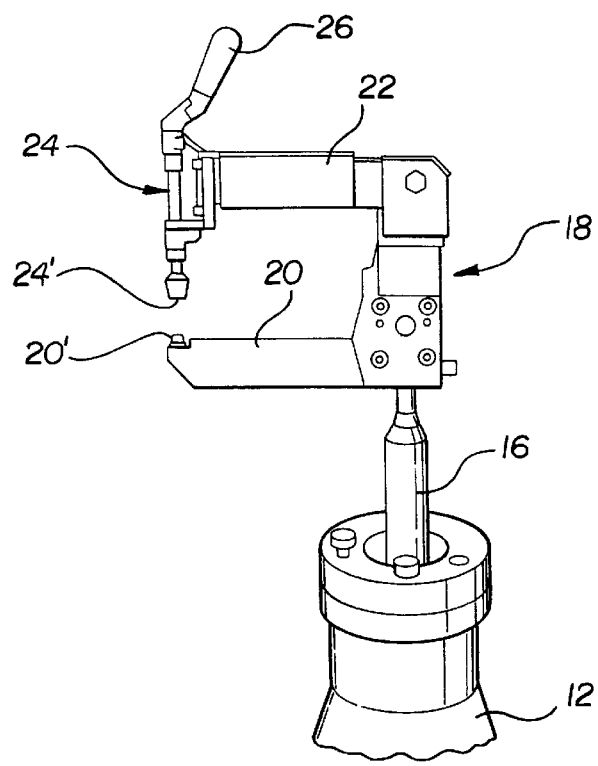
FIG. 3 is a perspective view of the prior art clamp assembly shown in FIG. 2 but without the associated panel.

In FIG. 1, a typical manner of supporting the inner panel 14 is shown. This is in accord with currently practice and thus is labeled prior art. Note that the inner panel 10 is held firmly by several clamping devices 18. Each clamp 18 is mounted upon the upper end portion of a column support shaft 16 and includes a lower arm portion 20 and an upper arm portion 22 as best shown in FIGS. 2 and 3. The lower arm 20 defines a surface 20' against which the bottom surface of panel 10 sits. The upper arm 22 carries a selectively latching securing member 24 with a surface 24' adapted to be moved to press against the upwardly facing surface 14 of the panel 10 when a handle 26 is pivoted. The movement of surface 24' against the surface 14 retains the panel against surface 20' on the lower arm 20. This security apparatus is currently in use for surface measuring and thus is labeled prior art. A problem with this type of securing apparatus is the upwardly projecting portions as represented by parts 22, 24, and 26 which interfere with free movement of the associated measuring device as previously described.

Figure 4:
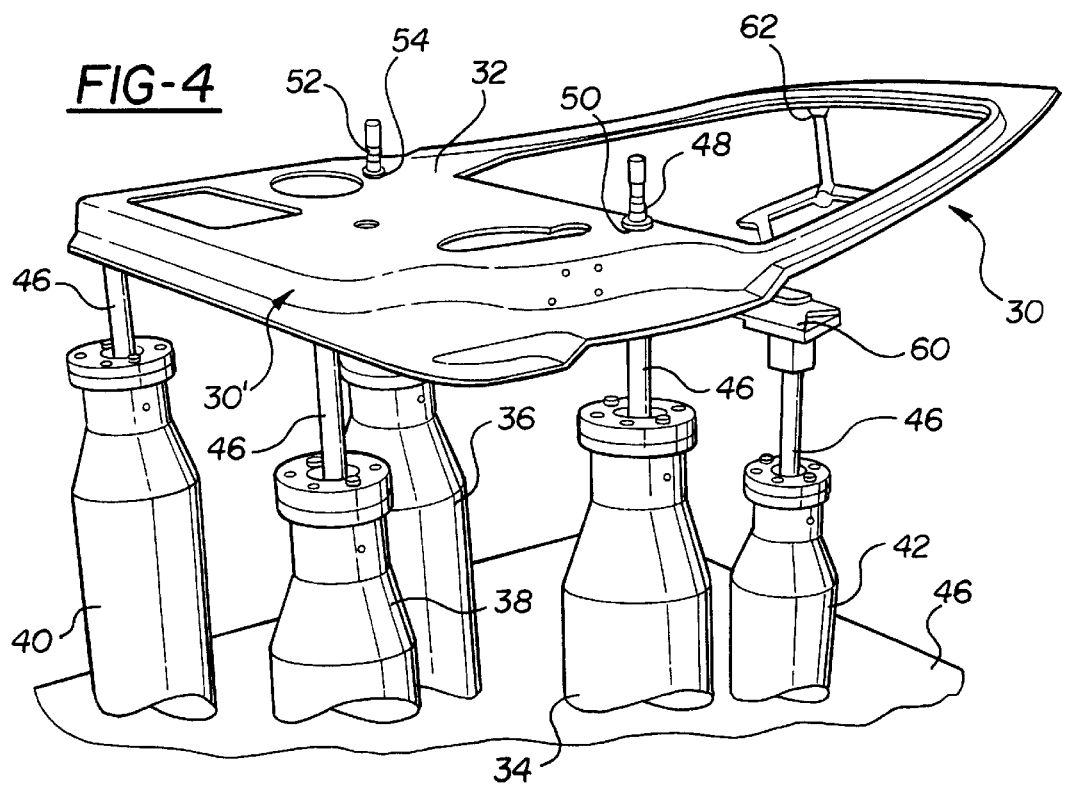
FIG. 4 is a perspective view of a door panel supported by a clampless MSD support and retention system used to stabilize an inner door stamping which results in an unobstructed upper surface of the door panel permitting movements of a surface measuring tool.

The objective of using the subject MSD mounting devices is to eliminate any obstructions which would interfere with a surface measuring tool by the projecting parts of clamps as previously discussed and shown in FIG. 1. As illustrated in FIG. 4, a complex and multi-curved stamped inner door panel 30 is illustrated with its interior or inner surface 32 facing upwards. The panel 30 is supported by a plurality of column supports 34, 36, 38, 40, and 42 which are placed upon and secured to a level surface 44. Each column support has an upwardly extending support shaft 46. The upper end portion of the column support 34 includes a cylindrical positioning fixture 48 which closely extends through a formed circular aperture 50 in the panel. An upwardly facing shoulder (underneath the panel 30) supportingly engages the lower surface of the panel. A close interfitting relationship between the fixture and formed hole locates the panel and prevents lateral movements normal to the axis of the fixture.

Similar to the support and locating system of fixture 48 and hole 50, the upper end portion of the column support 36 includes a cylindrical positioning fixture 52 which extends through an oblong shaped aperture 54 formed in the panel 30. The close fit between fixture 52 and the elongated sides of the oblong aperture fixes the door panel in the direction normal to the length of the oblong aperture while the elongation of the aperture permits slight inaccuracy in positioning the column support 36 relative to the aperture. Like the fixture 52, an upwardly facing shoulder (underneath the panel 30) supportingly engages the lower surface of the panel. A pair of cap members 56, 58 are secured respectively to the ends of the fixtures 48, 52 secures the panel against the support shoulders to secure the midportion of the panel to the column supports 34, 36.

Column supports 38 and 40 support the lower edge portion 30' of the panel 30. Each column support 38, 40 has a vertically extending shaft 46 which supports the lower edge portion 30' of the panel 30 in specific manner which will be detailed below. Turning now to the upper edge portion 30" of the panel, a fifth column support 42 is shown. Specifically, the support shaft 46 of the column support 42 is attached to a offset fixture 60 having a support surface 62 against which the upper portion 30" rests. The primary purpose of this support is to prevent any downward movement of the upper portion 30" of the door panel in response to downward forces generated as the measurement tool engages the inner door panel.

Figure 5:
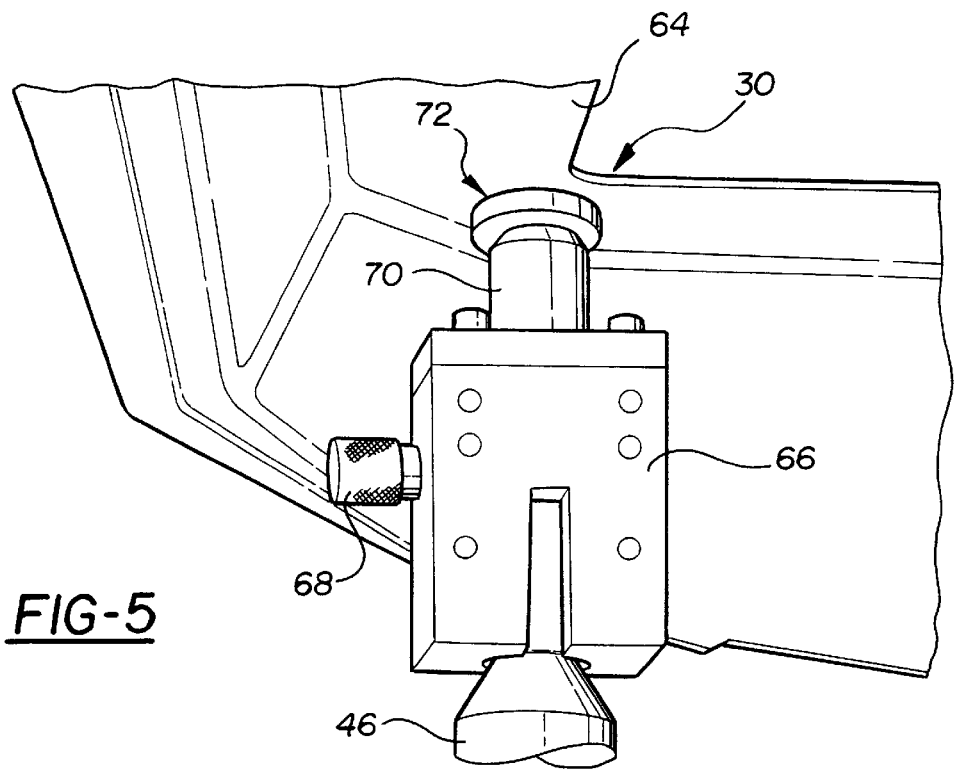
FIG. 5 is an enlarged perspective view of the underside of the inner door panel with an MSD device used to support the upper left corner of the panel shown in FIG. 4.
Figure 12:
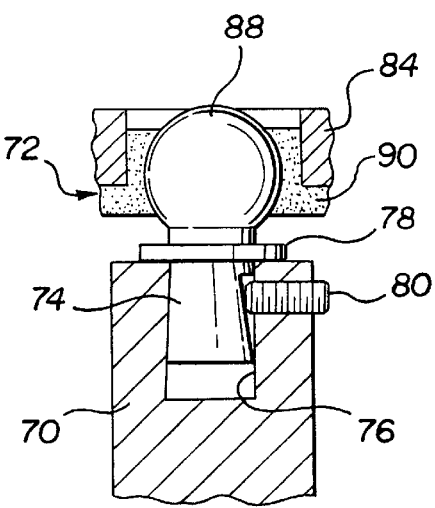
FIG. 12 a partially sectioned elevational side view of the ball support portion of the MSD prior to attachment to the base portion.

Specifically, support of the lower edge portion 30' of inner panel 30 is best shown in FIG. 5 where the upper end portion of the vertical support shaft 46 is seen extending upwardly from the column 40 toward the lower surface 64 of the inner door panel 30. A mounting block member 66 is secured to the shaft's upper end by a fastener 68. An upwardly projecting boss portion 70 is attached to the mounting block member 66 and has a MSD or magnetic support datum member 72 attached thereto. Specifically, referring to FIG. 12, the MSD assembly 72 has a stub shaft 74 which extends therefrom and into a bore 76 which is formed in the boss portion 70. A collar portion 78 of the MSD 72 supports it relative to the boss portion 70 and a set screw 80 secures it rigidly to the boss member 70.

Figure 7:
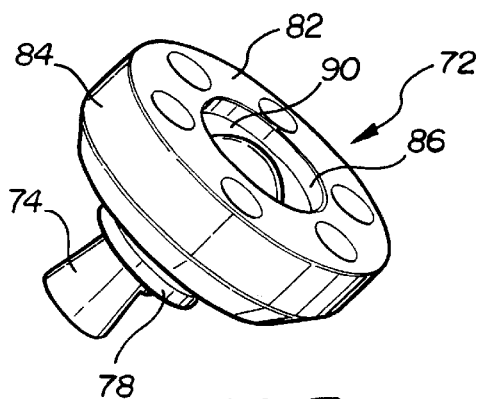
FIG. 7 is a perspective view of one embodiment of the MSD support head.
Figure 9:
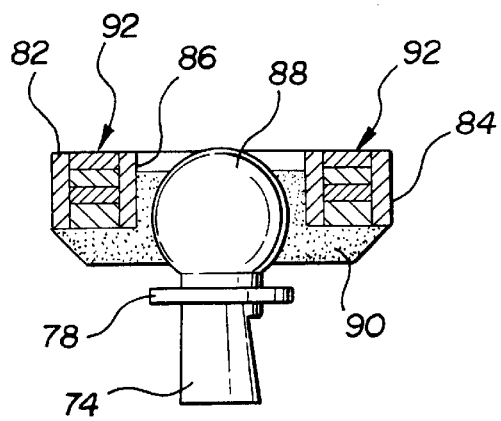
FIG. 9 is a elevational and sectioned view of the MSD taken along section line 9—9 in FIG. 8 and looking in the direction of the arrows.

As best seen in FIG. 7, the MSD 72 defines a flat upper surface 82 against which the lower surface 64 of the panel 30 is secured as previously explained in reference to FIG. 5. The surface 82 is part of an annularly shaped member 84 having a central aperture 86 formed therethrough. The aperture 86 receives a spherical end portion 88 of the stub shaft 74 as best seen in FIG. 9. The members 74 and 84 are attached together by a quantity of thermosetting or hardenable and resinous material elastomeric material 90 which is molded in situ about the spherical end portion 88 in a manner so that the end portion 88 is tightly captured. However, a parting material or agent is used to prevent the elastomeric material 90 from adhering to the member 88. In a preferred embodiment, an epoxy resin is utilized as the elastomeric material and a number of materials such as wax can be used as a parting agent to prevent molding of the epoxy to the member 74. Resultantly, the member 84 is free to pivot about the center of the rounded or spherically shaped end portion 88, hence supplying the "swivel" action necessary for the device to adjust to angulated surfaces of the inner door panel.

Figure 8:
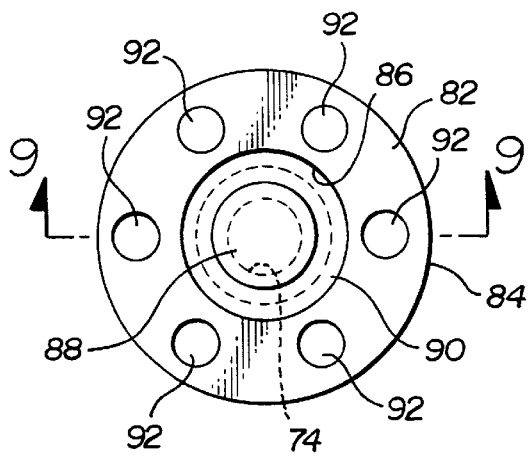
FIG. 8 is a top planar view of the MSD's flat contact surface.

The steel inner door panel 30 is secured down against the MSD's flat surface 82 by the force generated by magnet assemblies 92 which are mounted in apertures in the body 84. It has been found that the magnetic force of the MSD 72 to the steel panel 30 is desirably evenly produced when the magnet assemblies are placed circumferentially as shown in FIG. 8. Also, sufficient attractive force is generated when several magnets are stacked end to end as best seen in FIG. 9.

Figure 10:
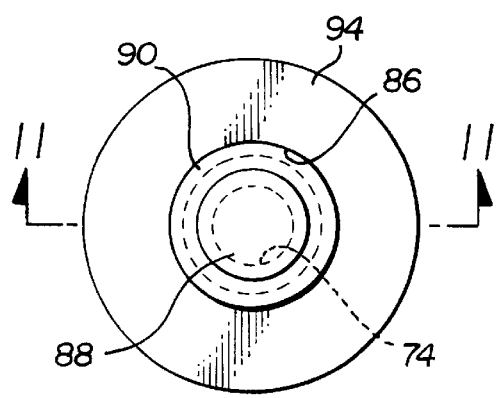
FIG. 10 is a top planar view of the contact surface of a second MSD embodiment.
Figure 11:
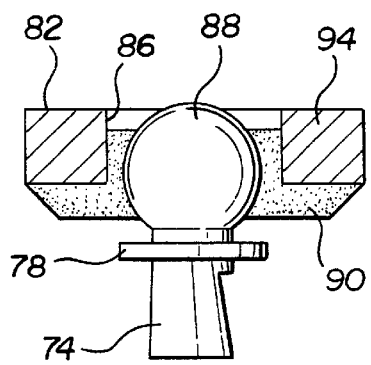
FIG. 11 is a elevational sectioned view of second embodiment taken along section line 11—11 in FIG. 10 and looking in the direction of the arrows.

A second embodiment of the MSD member is shown in FIGS. 10 and 11 where a magnet is shaped into an annular form 94 which serves as the main body portion of the MSD. The parts of this second MSD embodiment which are the same or very similar to those in the first embodiment are identified by the same numerals as previously pointed out.

Figure 6:
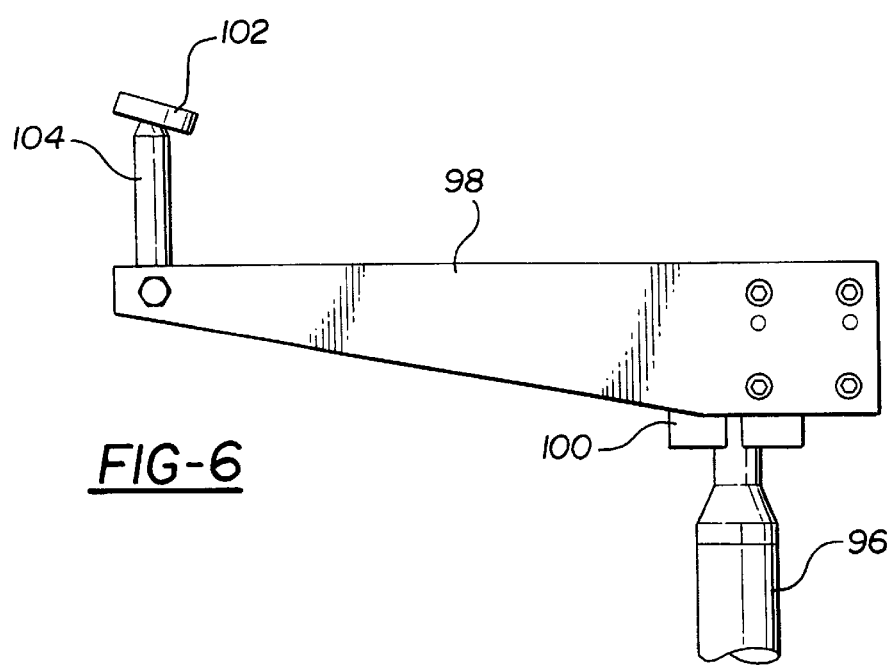
FIG. 6 is a elevational side view of subject MSD mounted on an extension arm useful when an offset is necessary because of a lack of space between column supports.

Finally, a modification of the support structure is shown in FIG. 6 where the support shaft 96 of a column support assembly cannot be directly placed where desired because of spacing of the columns. Specifically, the modification has an arm 98 which extends from a attaching portion 100 to an outwardly positioned MSD 102. The MSD 102 is attached upon an upper end portion of a vertical support stub shaft 104.

The inventive apparatus and method of use being thus described, it will be obvious that the same may be utilized with many different steel parts and other magnetically receptive parts. Also, the support arrangement could be useful for securing a part for processes other than surface measurement. Such variations are not to be regarded as a departure from the spirit and scope of the invention, and all such modifications as would be obvious to one skilled in the art are intended to be included within the scope of the following claims.

We claimed:

1. For supporting a complex curved object of magnetic reactive material having an upper surface and a lower surface in a manner such that the upper surface is substantially free of obstructions so as to permit measurement of the complex curved surface, a magnetic swiveling support, comprising:

a support stud member having a rounded end portion:

an annularly shaped base member with an aperture sufficient to receive said rounded end portion;

moldable means between said base member and said rounded end portion for attaching the two together and allowing said base member to swivel about said rounded end portion wherein said moldable means is a thermosetting elastomeric material;

a release agent carried by said rounded end portion to inhibit bonding of the thermosetting elastomeric material to said rounded end portion;

at least one magnet carried by said base member for attracting the complex curved object thereagainst.

2. For supporting a complex curved object of magnetic reactive material having an upper surface and a lower surface in a manner such that the upper surface is substantially free of obstructions so as to permit measurement of the complex curved surface, a magnetic swiveling support, comprising:

a support stud member having a rounded end portion:

an annularly shaped base member with an aperture sufficient to receive said rounded end portion, said base member being of magnetic material to thus form a magnet;

moldable means between said base member and said rounded end portion for attaching the two together and allowing said base member to swivel about said rounded end portion;

at least one magnet carried by said base member for attracting the complex curved object thereagainst.

3. For measuring a surface of an essentially two-faced sheet metal object of magnetic reactive material and having a substantially complex configuration, a magnetic swiveling support structure against which one of the sheet faces rests against for support so that an opposite sheet face is substantially unencumbered by objects and projections thus freeing the opposite sheet face for purposes of measuring a complex curved surface of the sheet metal object, the magnetic swiveling support, comprising:

a support stud member having a firmly supported lower end portion and an upper end portion shaped in a substantially spherical configuration;

an annularly shaped base member having a flat surface against which a complex curved object is adapted to rest against and having a central aperture sufficient to receive said upper end portion;

a moldable medium between said base member and said upper end portion for attaching the two together and permitting movement of said base member about said upper end portion;

said moldable medium is a thermosetting elastomeric material and said upper end portion carries a release agent to prevent bonding of the elastomeric material to said upper end portion;

said base member being magnetic for attracting the complex curved object to cause the curved object to be secured tightly against said flat surface.

4. For measuring a surface of an essentially two-faced sheet metal object of magnetic reactive material and having a substantially complex configuration, a magnetic swiveling support structure against which one of the sheet faces rests against for support so that an opposite sheet face is substantially unencumbered by objects and projections thus freeing the opposite sheet face for purposes of measuring a complex curved surface of the sheet metal object, the magnetic swiveling support, comprising:

a support stud member having a firmly supported lower end portion and an upper end portion shaped in a substantially spherical configuration;

an annularly shaped base member having a flat surface against which a complex curved surface of the metal object is adapted to rest against and having a central aperture sufficient to receive said upper end portion;

a moldable medium between said base member and said upper end portion for attaching the two together and permitting movement of said base member about said upper end portion;

said base member being of magnetic material to form a magnet for attracting a complex curved surface of the metal object to cause the metal object to be secured tightly against said flat surface.

* * * * *